United States Patent [19]

Ishii

[11] Patent Number: 5,080,473

[45] Date of Patent: Jan. 14, 1992

[54] VARI-FOCAL LENS SYSTEM
[75] Inventor: Atsujirou Ishii, Tokyo, Japan
[73] Assignee: Olympus Optical Co., Ltd., Tokyo, Japan
[21] Appl. No.: 493,346
[22] Filed: Mar. 14, 1990
[30] Foreign Application Priority Data Mar. 15, 1989 [JP] Japan .................. 1-060772

[51] Int. Cl.$^5$ .............................. G02B 15/00
[52] U.S. Cl. ................... 359/654; 359/686
[58] Field of Search ............ 350/413, 423, 432

[56] References Cited

U.S. PATENT DOCUMENTS 4,776,679 10/1988 Kitagishi et al. ............... 350/413
4,840,467 6/1989 Takada et al. ................. 350/413

FOREIGN PATENT DOCUMENTS 61-176906 8/1986 Japan .
63-287810 11/1988 Japan .

Primary Examiner—Paul M. Dzierzynski
Attorney, Agent, or Firm—Cushman, Darby & Cushman

[57] ABSTRACT

A vari-focal lens system comprising a first lens unit having positive refractive power and arranged on the extremely object side, a second lens unit having negative refractive power and arranged on the image side of the first lens unit, and a rear lens unit having negative refractive power, at least one lens component arranged in the rear lens unit being designed as a negative graded refractive index lens.

6 Claims, 5 Drawing Sheets

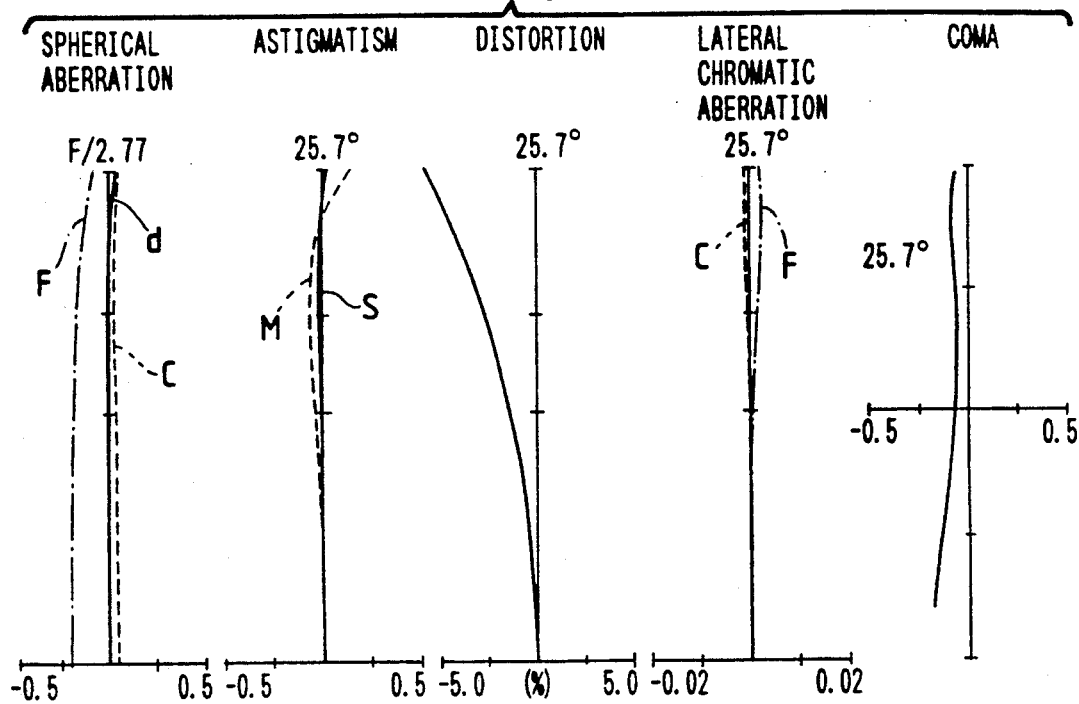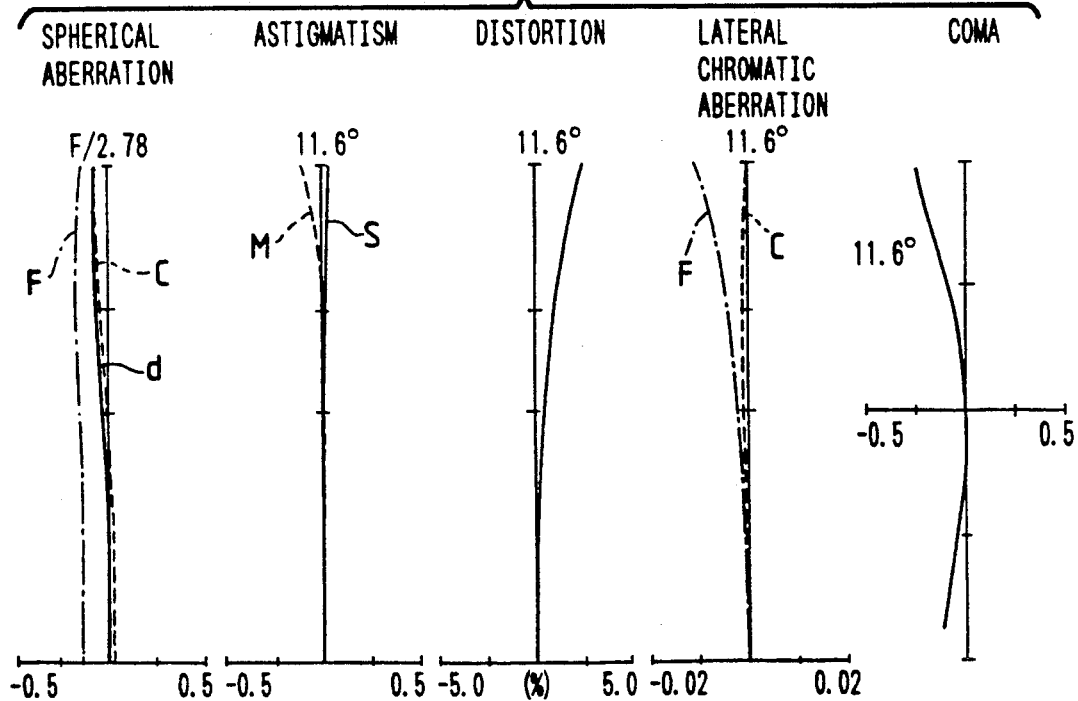

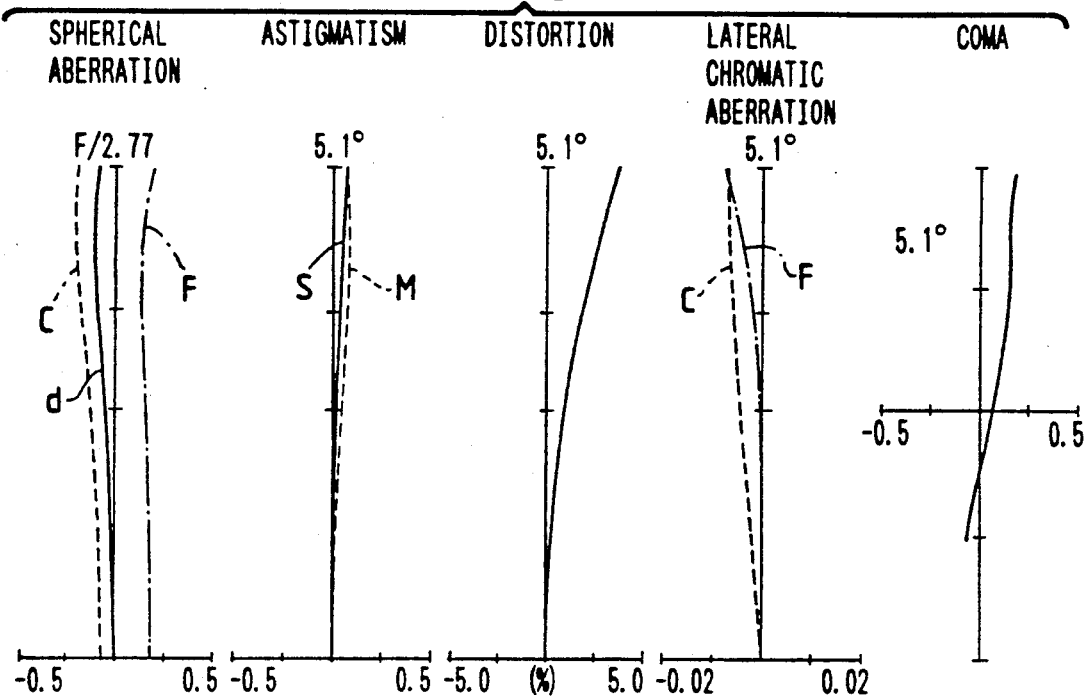
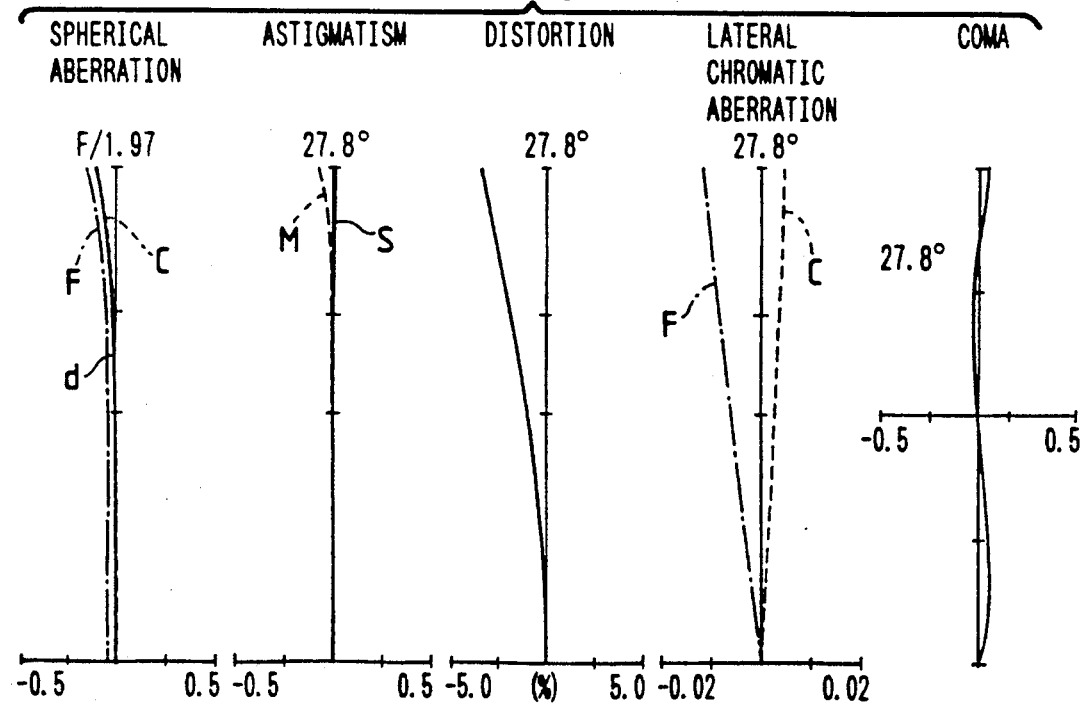

VARI-FOCAL LENS SYSTEM

BACKGROUND OF THE INVENTION

A) Field of the Invention

The present invention relates to a compact vari-focal lens system having a high vari-focal ratio.

B) Description of the Prior Art

In designing a vari-focal lens system having a high vari-focal ratio, aberrations can hardly be corrected without composing the lens system of at least three lens units or reserving at least two airspaces variable for zooming.

As typical examples of vari-focal lens systems having high vari-focal ratios, there are generally known the lens system which consists, in the order form the object side, of three lens units, i.e., a lens unit having positive refractive power, a lens unit having negative refractive power and a lens unit having positive refractive power, and the lens system which consists of four lens units, i.e., a lens unit having positive refractive power, a lens unit having negative refractive power, a lens unit having positive refractive power and a lens unit having positive refractive power, or four lens unit, i.e., a lens unit having positive refractive power, a lens unit having negative refractive power, a lens unit having negative refractive power and a lens unit having positive refractive power. In these vari-focal lens systems, the second lens units having negative refractive powers contribute most greatly to the variations of focal lengths. As a conventional example of these vari-focal lens systems, there is known the lens system disclosed by Japanese Unexamined Published Patent Application No. 287810/63.

In the recent years, it is strongly demanded to make compacter these vari-focal lens systems having relatively high vari-focal ratios, and it is necessary for shortening total lengths of these vari-focal lens systems to strengthen refractive power of each of the lens units. When the refractive power is strengthened, however, each of the lens units produces more remarkable aberrations which are hardly correctable. In order to correct these aberrations, it is necessary to increase the number of the lens units, thereby making it impossible to shorten the total lengths of the lens systems.

SUMMARY OF THE INVENTION

A primary object of the present invention is to provide a compact vari-focal lens system which has a high vari-focal ratio and in which the aberrations produced by strengthening the refractive power of each lens unit are corrected favorably without increasing the number of lens elements.

The vari-focal lens system according to the present invention comprises a first lens unit which is arranged on the extremely object side and has positive refractive power, a rear lens unit which comprises a graded refractive index lens element having negative refractive power and a positive lens element, arranged on the extremely image side and has positive refractive power, and a second lens unit which is arranged between the first lens unit and the rear lens unit, and has negative refractive power, said vari-focal lens system being adapted in such a manner that focal length of the lens system as a whole is changed by varying the airspace reserved between said first lens unit and said second lens unit and the airspace reserved between said second lens unit and the rear lens unit, and that the imaging position thereof is maintained constant despite the change of the focal length. Refractive index profile of said graded refractive index lens element is expressed by the following formula and satisfies the condition (1):

$$n(r) = N_0 + N_1 r^2 + N_2 r^4 + \ldots$$

$$N_1 > 0 \tag{1}$$

wherein the reference symbol r represents distance as measured from the optical axis in the direction perpendicular to the optical axis, the reference symbol $N_0$ designates refractive index of the graded refractive index lens element as measured on the optical axis, and the reference symbols $N_1, N_2, \ldots$ denote the refractive index distribution coefficients. In a general vari-focal lens system which consists of three lens units, i.e., a positive lens unit, a negative lens unit and a positive lens unit or four lens units, i.e., a positive lens unit, a negative lens unit, positive lens unit and a positive lens unit, the lens system will tend to have a negative Petzval's sum when refractive power of each of the lens units is strengthened for shortening total length of the lens system. When refractive indices of the positive lens units are lowered for correcting the Petzval's sum, spherical aberration and coma are produced. Accordingly, it is difficult to correct the Petzval's sum without aggravating the other aberrations when the lens system is composed only of homogeneous lens elements.

For this reason, the vari-focal lens system according to the present invention is so designed as to correct the Petzval's sum by using the graded refractive index lens element described above.

Refractive power of such a graded refractive index lens element can be divided into the refractive power of the lens surface $\Phi_S$ and refractive power of the medium $\Phi_M$. When the graded refractive index lens is considered as a thin lens element, the refractive power of medium is expressed as:

$$\Phi_M = -2N_1 D$$

wherein the reference symbol D represents thickness of the lens element. Contribution of a homogeneous lens element having a refractive index of n and a refractive power of $\Phi$ is expressed as $\Phi/n$. On the other hand, contribution of the above-mentioned graded refractive index lens element to Petzval's sum is expressed as $\Phi_S/N_0 = \Phi_M/N_0^2$. Since $N_0 > 1$, it is therefore possible to design a graded refractive index lens element so as to have contribution to Petzval's sum smaller than that of a homogeneous lens element having the same refractive power as that of the graded refractive index lens element by sharing the refractive power of the graded refractive index lens element with the medium thereof.

In the vari-focal lens system according to the present invention, Petzval's sum is corrected favorably by using a graded refractive index lens element as a negative lens element arranged in the rear lens unit and sharing the negative refractive power with the medium thereof.

The above-mentioned condition (1) $N_1 > 0$ is required for the graded refractive index lens element to have negative refractive power in the medium thereof. Since refractive power of the lens medium is determined dependently on $N_1$, the lens medium has positive refractive power when the above-mentioned condition (1) is not satisfied or $N_1$ is larger than 0, and it is necessary in such a case to remarkably strengthen refractive power of the lens surface for imparting negative refractive power to the graded refractive index lens and the graded refractive index lens element will not contribute to the correction of Petzval's sum.

Further, it is necessary in a general vari-focal lens system to correct chromatic aberration in each lens unit independently. For this purpose, it is necessary in the rear lens unit having positive refractive power as a whole to correct the chromatic aberration by reducing Abbe's numbers of the negative lens elements comprised therein and increasing Abbe's numbers of the positive lens element comprised therein.

Now, let us consider chromatic aberration in a lens system consisting only of thin lens elements for simplicity. In case of a thin lens element, longitudinal chromatic aberration of a thin lens element having refractive power $\Phi$ and an Abbe's number $\nu$ is expressed as $\Phi/\nu$. Further, longitudinal chromatic aberration of such a graded refractive index lens element as that used in the vari-focal lens system according to the present invention is expressed as:

$$\Phi_S/V_0 + \Phi_M/V_1$$

wherein the reference symbols $\Phi_S$ and $\Phi_M$ represent the above-mentioned refractive power of surface and the refractive power of medium respectively, and the reference symbols $V_0$ and $V_1$ designate the values given by the following formulae:

$$V_0 = \{N_0(d) - 1\}/\{N_0(F) - N_0(C)\}$$

$$V_1 = \{N_1(d)\}/\{N_1(F) - N_1(C)\}$$

wherein the reference symbols $N_0(d)$, $N_0(F)$ and $N_0(C)$ represent refractive indices for the d-line, F-line and C-line respectively on the optical axis, and the reference symbols $N_1(d)$, $N_1(F)$ and $N_1(C)$ designate values of the refractive index distribution coefficient $N_1$ of the second order for the d-line, F-line and C-line respectively.

As is understood from the above-mentioned formulae, it can be considered that the longitudinal chromatic aberration produced by the surface of the graded refractive index lens element is the same as that produced by the homogeneous lens element having the Abbe's number $V_0$, whereas the longitudinal chromatic aberration produced by the medium of the graded refractive index lens element is the same as that produced by the homogeneous lens element having the Abbe's number $V_1$.

The zoom lens system according to the present invention is adapted in such a manner that the graded refractive index lens element used in the rear lens unit has a negative value of $\Phi_M$ and a small value of $V_1$ for favorably correcting the chromatic aberration which would otherwise tend to be undercorrected by the rear lens unit having the positive refractive power. The chromatic aberration can be corrected more favorably by selecting a value of $V_1$ which is smaller than that of $V_0$ for the reason described below:

Since $\Phi = \Phi_S + \Phi_M$, the chromatic aberration $\Phi_S/V_0 + \Phi_M/V_1$ can be transformed as follows:

$$\Phi_S/V_0 + \Phi_M/V_1 = (\Phi - \Phi_M)/V_0 + \Phi_M/V_1 = \Phi/V_0 - \Phi_M(1/V_0 - 1/V_1)$$

Since $N_1 > 0$ in this formula, $\Phi_M$ has a negative value. Accordingly, it is necessary to select a negative value for $(1/V_0 - 1/V_1)$ for making the chromatic aberration to be produced by the graded refractive index lens element less than that to be produced by a homogeneous lens element.

It is therefore desirable to select a value of $V_1$ smaller than that of $V_0$.

Further, it is desirable to select a value larger than 40 for $V_1$ to correct chromatic aberration.

Furthermore, since refractive power of the rear lens unit is strengthened by shortening total length of the vari-focal lens system, spherical aberration and coma are produced very remarkably. In order to correct these aberrations, the surfaces of the negative lens element arranged in the rear lens unit must have higher curvature, and these concave surfaces will produce coma of high orders and degrade image quality remarkably on the marginal portions of an image. The conventional vari-focal lens systems consisting only of homogeneous lens elements can hardly correct these aberrations.

A graded refractive index lens element produces aberrations which are equivalent to those produced by the surface of a homogeneous lens element, aberrations which are produced due to variation of refractive index on the lens surface and aberrations which are produced in the medium of the lens element.

The graded refractive index lens element which satisfies the condition (1) and especially has a refractive index profile increasing refractive index as the portions thereof are farther from the optical axis has a capability for correcting spherical aberration far higher than that of a homogeneous lens element having the same curvature as that of the graded refractive index lens element. Accordingly, such a graded refractive index lens element can correct spherical aberration sufficiently even when curvature is low on the convex surfaces thereof and production of coma of high orders can be reduced by lowering the curvature thereof. In addition, correction of spherical aberration by the refractive index distribution on the surface of the graded refractive index lens element is generally dependent largely on the coefficient $N_1$ of the term of $r^2$ in the refractive index distribution formula.

As is understood from the foregoing description, the graded refractive index lens element used in the vari-focal lens system according to the present invention has very remarkable effects for correcting Petzval's sum, chromatic aberration and coma of high orders. These aberrations are dependent most largely on the coefficient $N_1$ of the term of $r^2$ in the refractive index distribution formula and can be corrected sufficiently favorably without taking the coefficients of the terms of $r^4$ higher orders into consideration. Accordingly, the graded refractive index lens element may have a relatively simple refractive index profile and can be manufactured easily. Further, the refractive index distribution satisfying the above-mentioned conditions for $N_1$ and $V_1$ allows Abbe's number to be reduced while increasing refractive index as the lens portions are farther from the optical axis. Since the glass materials having the tendency to allow Abbe's number to be reduced while increasing refractive index as the lens portions are farther from the optical axis are now available, the graded refractive index lens element satisfying the conditions for $N_1$ and $V_1$ can easily be manufactured and a broad range of refractive index variation can be reserved for the graded refractive index lens element.

Since the graded refractive index lens element to be used in the vari-focal lens system according to the present invention must have a relatively high refractive index of medium $\Phi_M$, it is necessary for this purpose to reserve a large difference in refractive index between the portion on the optical axis and the marginal portion of the graded refractive index element, and it is desirable from the viewpoint of manufacturing to design the graded refractive index lens element so as to satisfy the following condition:

$$N_0 < 1.70$$

wherein the reference symbol $N_0$ represents refractive index of the graded refractive index lens element as measured on the optical axis.

If $N_0$ does not satisfy the above-mentioned condition, it will be impossible to reserve a large difference in refractive index between the portion on the optical axis and the marginal portion of the graded refractive index lens element, thereby making it impossible to allow the graded refractive index lens element to have a high refractive power $\Phi_M$.

Further, in the vari-focal lens system according to the present invention, the first lens unit and the second lens unit tend to have high refractive indices for shortening total length of the vari-focal lens system as a whole. When these lens unit have high refractive indices, however, distortion will be produced remarkably. In order to correct this distortion, it is effective to use an aspherical surface in the first lens unit or the second lens unit. Shape of the aspherical surface to be used in the first lens unit or the second lens unit is expressed by the following formula:

$$X = \frac{y^2/r}{1 + \sqrt{1 - p(y/r)^2}} + By^2 + Ey^4 + Fy^6 + Gy^8 + \ldots$$

wherein the reference symbol r represents radius of curvature at the vertex of the aspherical surface, the reference symbol p designates the conical constant, and the reference symbols B, E, F, G, ... denote the aspherical surface coefficients.

As for the composition of the rear lens unit of the vari-focal lens system according to the present invention, it is desirable to compose it, in the order from the object side, of a first lens component having positive refractive power, a second lens component having negative refractive power and a third lens component having positive refractive power. In addition, it is desirable to design the negative lens element to be arranged in the second lens component as a graded refractive index lens element.

BRIEF DESCRIPTION OF THE DRAWINGS

FIG. 3 through FIG. 5 show graphs illustrating aberration characteristics of the Embodiment 1 of the present invention; and FIG. 6 through FIG. 8 show graphs illustrating aberration characteristics of the Embodiment 2 of the present invention.

DETAILED DESCRIPTION OF THE PREFERRED EMBODIMENTS

Figure 1:
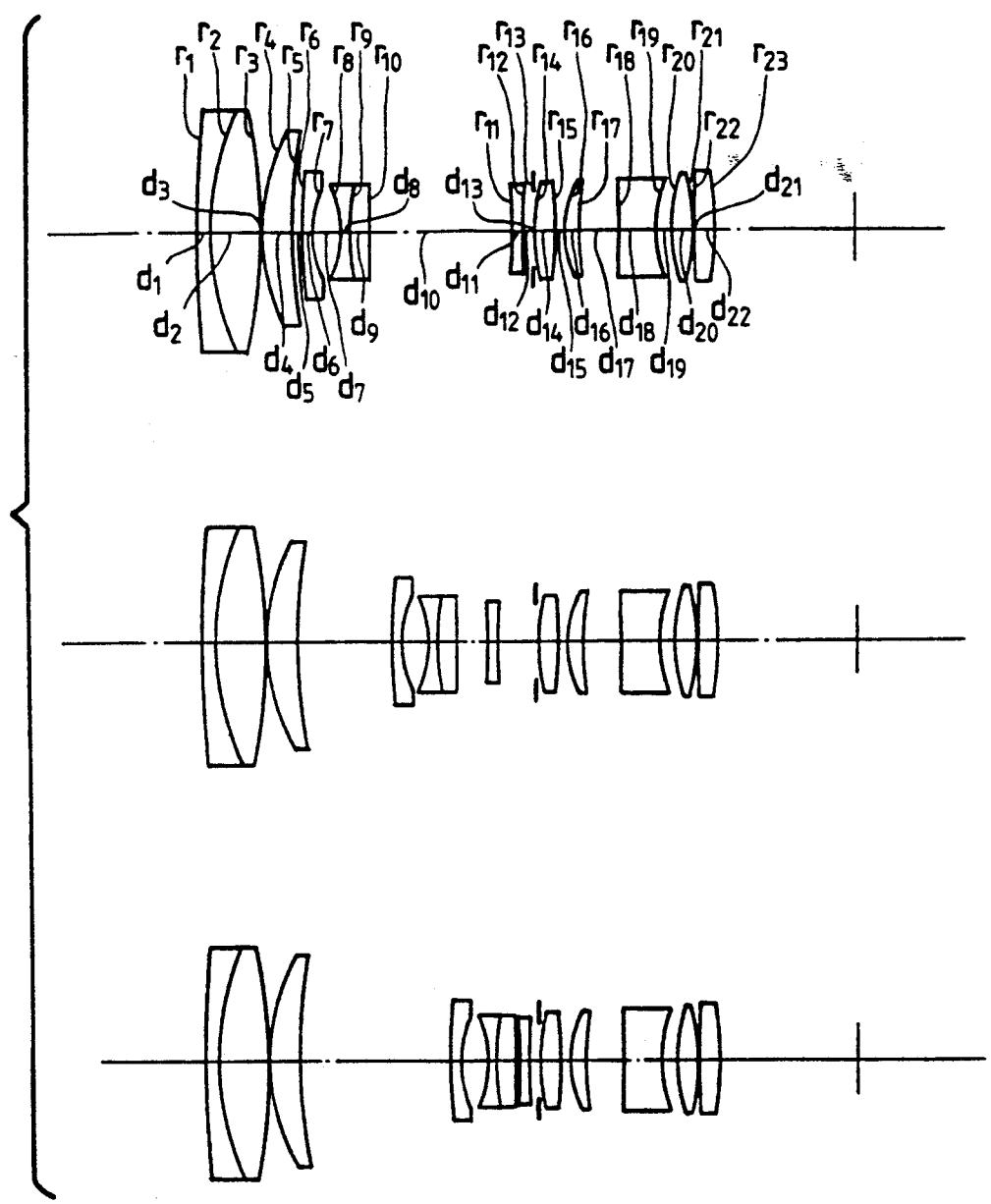
FIG. 1 shows a sectional view illustrating composition of an Embodiment 1 of the vari-focal lens system according to the present invention.

Now, the present invention will be described more detailedly with reference to the preferred Embodiments of the vari-focal lens system shown in the accompanying drawings and given in the form of the following numerical data:

| Embodiment 1 $f = 9 \sim 45$ mm, F/2.8 $2\omega = 47.0° \sim 10.2°$ | | | |
|---|---|---|---|
| $r_1 = 120.8794$ | $d_1 = 1.3177$ | $n_1 = 1.84666$ | $\nu_1 = 23.88$ |
| $r_2 = 27.8756$ | $d_2 = 5.0000$ | $n_2 = 1.60311$ | $\nu_2 = 60.70$ |
| $r_3 = -59.7085$ | $d_3 = 0.1500$ | | |
| $r_4 = 20.6484$ | $d_4 = 3.0000$ | $n_3 = 1.69680$ | $\nu_3 = 55.52$ |
| $r_5 = 64.4890$ | $d_5 = D_1$ (variable) | | |
| $r_6 = 50.8491$ | $d_6 = 1.0000$ | $n_4 = 1.74100$ | $\nu_4 = 52.68$ |
| $r_7 = 10.3632$ | $d_7 = 2.8000$ | | |
| $r_8 = -12.1140$ (aspherical surface) | $d_8 = 0.9000$ | $n_5 = 1.69680$ | $\nu_5 = 55.52$ |
| $r_9 = 27.5291$ | $d_9 = 2.0000$ | $n_6 = 1.84666$ | $\nu_6 = 23.78$ |
| $r_{10} = 130.4203$ | $d_{10} = D_2$ (variable) | | |
| $r_{11} = -39.5583$ | $d_{11} = 1.0000$ | $n_7 = 1.69680$ | $\nu_7 = 55.52$ |
| $r_{12} = 76.5498$ | $d_{12} = D_3$ (variable) | | |
| $r_{13} = \infty$ (stop) | $d_{13} = 0.1493$ | | |
| $r_{14} = 21.6015$ | $d_{14} = 2.0000$ | $n_8 = 1.78472$ | $\nu_8 = 25.71$ |
| $r_{15} = -40.3112$ | $d_{15} = 0.8500$ | | |
| $r_{16} = 10.4268$ | $d_{16} = 1.5000$ | $n_9 = 1.80100$ | $\nu_9 = 34.97$ |
| $r_{17} = 32.9138$ | $d_{17} = 3.6791$ | | |
| $r_{18} = -97.8524$ | $d_{18} = 3.6236$ | $n_{10}$ (graded refractive index lens) | |
| $r_{19} = 14.8237$ | $d_{19} = 1.5000$ | | |
| $r_{20} = 18.3806$ | $d_{20} = 2.0000$ | $n_{11} = 1.69680$ | $\nu_{11} = 55.52$ |
| $r_{21} = -24.5821$ | $d_{21} = 0.1500$ | | |
| $r_{22} = 227.6187$ | $d_{22} = 2.0000$ | $n_{12} = 1.69680$ | $\nu_{12} = 55.52$ |
| $r_{23} = -28.7295$ | | | |

| f | 9 | 20 | 45 |
|---|---|---|---|
| $D_1$ | 1.000 | 9.371 | 15.048 |
| $D_2$ | 14.348 | 3.106 | 0.300 |
| $D_3$ | 1.000 | 3.871 | 1.000 |

| aspherical surface coefficients | |
|---|---|
| $P = 1.000$, | $E = 0.45455 \times 10^{-4}$ |
| $F = 0.92907 \times 10^{-6}$, | $G = -0.57758 \times 10^{-7}$ |

| graded refractive index lens | | |
|---|---|---|
| | $N_0$ | $N_1$ |
| d-line | 1.56965 | $0.80000 \times 10^{-2}$ |
| C-line | 1.56620 | $0.77600 \times 10^{-2}$ |
| F-line | 1.57775 | $0.85600 \times 10^{-2}$ |
| | $V_0$ | $V_1$ |
| V | 49.33000 | $0.10000 \times 10^2$ |
| | $N_2$ | $N_3$ |
| d-line | $0.10000 \times 10^{-8}$ | $0.10000 \times 10^{-15}$ |
| C-line | $0.97000 \times 10^{-9}$ | $0.97000 \times 10^{-16}$ |
| F-line | $0.10700 \times 10^{-8}$ | $0.10700 \times 10^{-15}$ |
| | $V_2$ | $V_3$ |
| V | $0.10000 \times 10^2$ | $0.10000 \times 10^2$ |

| Embodiment 2 $f = 8 \sim 48$ mm, F/2 $2\omega = 53.1° \sim 9.5°$ | | | |
|---|---|---|---|
| $r_1 = 81.1158$ | $d_1 = 1.5000$ | $n_1 = 1.80518$ | $\nu_1 = 25.43$ |
| $r_2 = 31.0136$ | $d_2 = 6.1000$ | $n_2 = 1.69680$ | $\nu_2 = 55.52$ |
| $r_3 = -386.3367$ | $d_3 = 0.1500$ | | |
| $r_4 = 25.9115$ | $d_4 = 4.8000$ | $n_3 = 1.69680$ | $\nu_3 = 55.52$ |
| $r_5 = 71.1318$ | $d_5 = D_1$ (variable) | | |
| $r_6 = -90.7164$ (aspherical | $d_6 = 1.5000$ | $n_4 = 1.78800$ | $\nu_4 = 47.38$ |

-continued

Embodiment 2
f = 8 ~ 48 mm, F/2
2ω = 53.1° ~ 9.5°

| surface) | | | |
|---|---|---|---|
| $r_7 = 7.5421$ | $d_7 = 3.0000$ | | |
| $r_8 = -16.8463$ | $d_8 = 1.0000$ | $n_5 = 1.69680$ | $\nu_5 = 55.52$ |
| $r_9 = 133.7269$ | $d_9 = 0.3000$ | | |
| $r_{10} = 15.4048$ | $d_{10} = 1.5000$ | $n_6 = 1.84666$ | $\nu_6 = 23.78$ |
| $r_{11} = 24.4828$ | $d_{11} = D_2$ (variable) | | |
| $r_{12} = -37.4586$ | $d_{12} = 1.9000$ | $n_7 = 1.78300$ | $\nu_7 = 36.15$ |
| $r_{13} = -24.7380$ | $d_{13} = D_3$ (variable) | | |
| $r_{14} = \infty$ (stop) | $d_{14} = 2.0000$ | | |
| $r_{15} = 15.5596$ | $d_{15} = 3.0000$ | $n_8 = 1.83400$ | $\nu_8 = 37.16$ |
| $r_{16} = -5136.7166$ | $d_{16} = 1.0000$ | | |
| $r_{17} = 18.6210$ | $d_{17} = 2.5000$ | $n_9 = 1.83400$ | $\nu_9 = 37.16$ |
| $r_{18} = -157.7023$ | $d_{18} = 1.0524$ | | |
| $r_{19} = -77.2378$ | $d_{19} = 6.8467$ | $n_{10}$ (graded refractive index lens) | |
| $r_{20} = 29.8698$ | $d_{20} = 1.6136$ | | |
| $r_{21} = 96.6174$ | $d_{21} = 2.5000$ | $n_{11} = 1.77250$ | $\nu_{11} = 49.66$ |
| $r_{22} = -20.8171$ | $d_{22} = 0.3000$ | | |
| $r_{23} = -58.8269$ | $d_{23} = 2.5000$ | $n_{12} = 1.77250$ | $\nu_{12} = 49.66$ |
| $r_{24} = -21.2913$ | | | |

| f | 8 | 20.6 | 48 |
|---|---|---|---|
| $D_1$ | 2.000 | 14.109 | 20.492 |
| $D_2$ | 1.500 | 5.362 | 1.500 |
| $D_3$ | 19.792 | 3.821 | 1.300 |

| aspherical surface coefficients | |
|---|---|
| P = 1.0000, | E = $0.51637 \times 10^{-4}$ |
| F = $-0.49535 \times 10^{-6}$, | G = $0.31810 \times 10^{-8}$ |

| graded refractive index lens | | |
|---|---|---|
| | $N_0$ | $N_1$ |
| d-line | 1.67270 | $0.80000 \times 10^{-2}$ |
| C-line | 1.66660 | $0.78667 \times 10^{-2}$ |
| F-line | 1.68755 | $0.83111 \times 10^{-2}$ |
| | $V_0$ | $V_1$ |
| V | 32.10000 | $0.18000 \times 10^2$ | wherein the reference symbols $r_1, r_2, \ldots$ represent radii of curvature on the surfaces of the respective lens elements, the reference symbols $d_1, d_2, \ldots$ designate thicknesses of the respective lens elements and airspace reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

In each of the preferred Embodiments, arranged between the second lens unit and the rear lens unit is a third lens unit having weak refractive power which performs a roll to maintain the image point of the vari-focal lens system at a constant location by being moved along the optical axis in synchronization with the movements of the lens units for varying focal length. Out of the Embodiments described above, the Embodiment 1 has the composition illustrated in FIG. 1 wherein the rear lens unit comprises a first lens component consisting of two positive lens elements, a second negative lens component and a third lens component, said second lens component being designed as a graded refractive index lens element. Further, the eighth surface ($r_8$) is designed as an aspherical surface.

Aberration characteristics at the wide position, intermediate focal length and tele position of the Embodiment 1 are visualized in FIG. 3, FIG. 4 and FIG. 5 respectively.

Figure 2:
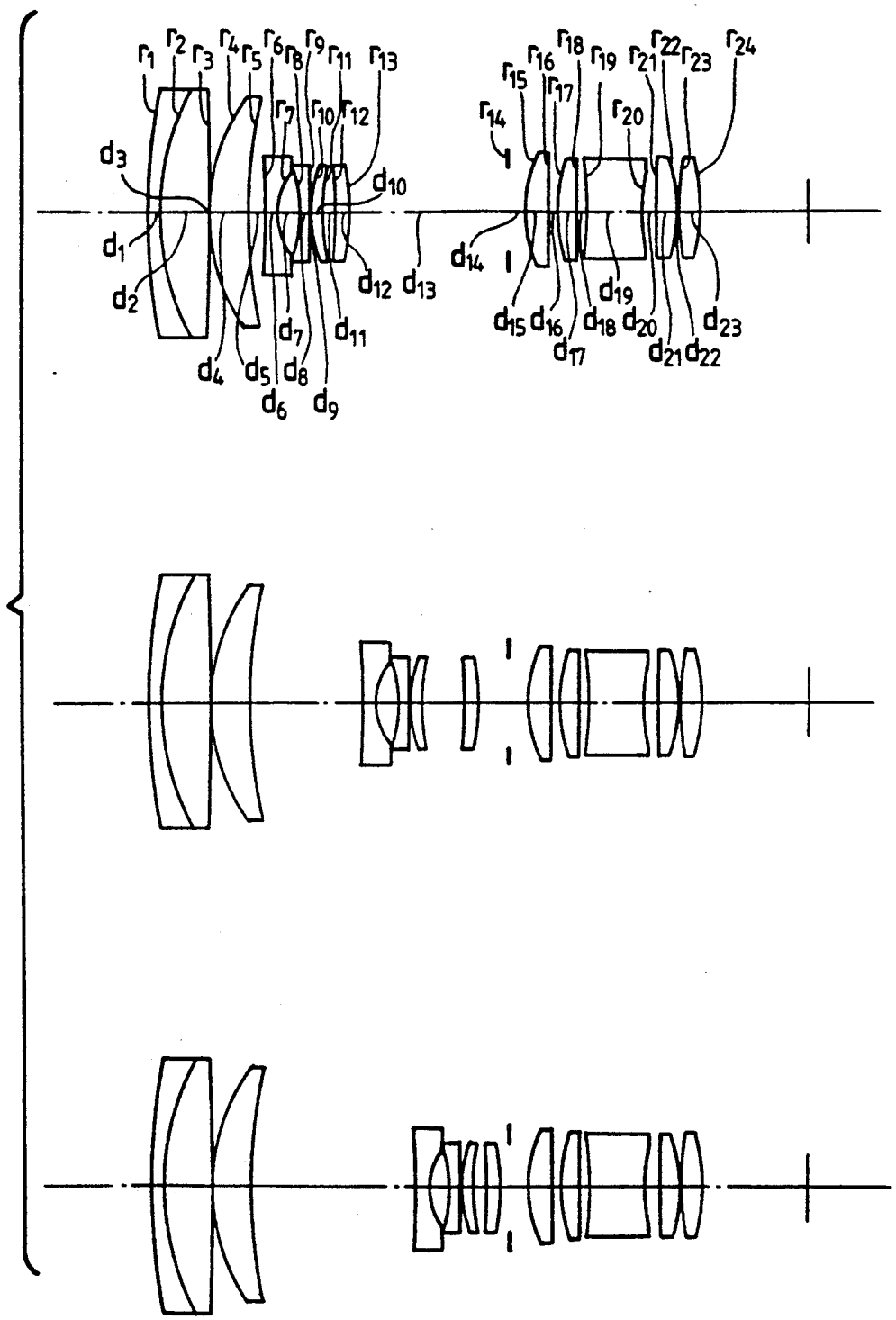
FIG. 2 shows a sectional view illustrating composition of an Embodiment 2 of the vari-focal lens system according to the present invention.

The Embodiment 2 has the composition illustrated in FIG. 2 wherein the rear lens unit comprises a lens component similarly consisting of two positive lens elements, a negative lens component consisting of a single negative lens element, and a positive lens component consisting of two positive lens elements, said negative lens element being designed as a graded refractive index lens element. Further, the sixth surface is designed as an aspherical surface.

Figure 7:
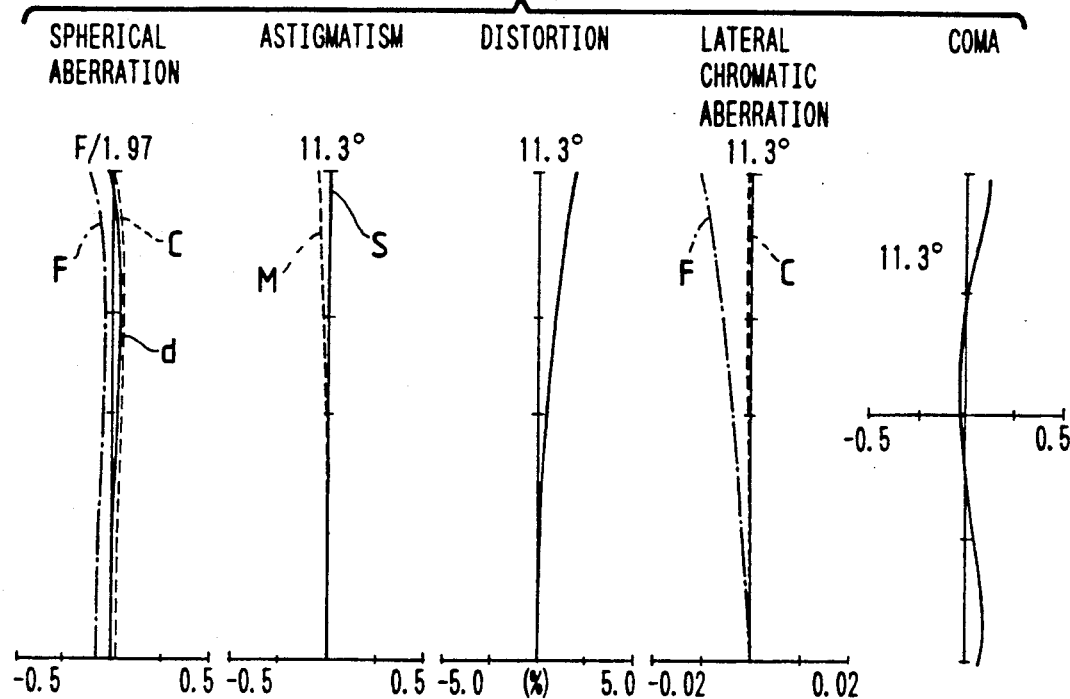
Figure 8:
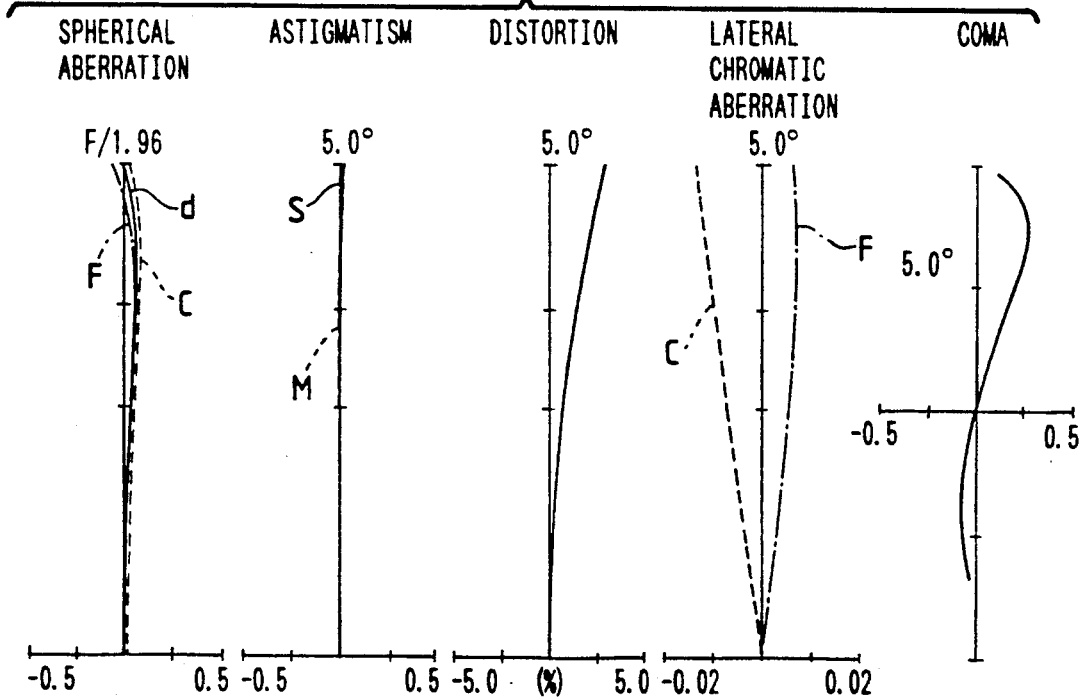

Aberration characteristics at the wide position, intermediate focal length and tele position of the Embodiment 2 are visualized in FIG. 6, FIG. 7 and FIG. 8 respectively.

The vari-focal lens system according to the present invention has a vari-focal ratio higher than those of the conventional vari-focal lens systems, a very compact design and favorably corrected aberrations such as Petzval's sum and chromatic aberration.

I claim:

1. A vari-focal lens system comprising in order from the object side:
   a first lens unit disposed on an extreme object side of said lens system and having a positive refractive power;
   a second lens unit having a negative refractive power;
   a third lens unit; and
   a fourth lens unit including, in order from the object side, a first positive lens component, a negative lens component comprising a graded refractive index lens element having a negative refractive power and a second positive lens component, said fourth lens unit having a positive refractive power as a whole;
   wherein said lens system is designed in such a manner that the focal length of the lens system as a whole is changed by varying airspaces reserved between said lens units;
   wherein said graded refractive index lens element has a refractive index profile expressed by the formula shown below and satisfying the following condition: (1):

$$n(r) = N_0 = N_1 r^2 + N_2 r^4 + \ldots$$

$$N_1 > 0 \tag{1}$$

wherein the reference symbol r represents distance as measured from an optical axis in a direction perpendicular to the optical axis, the reference symbol $N_0$ designates refractive index of the graded refractive lens element as measured on the optical axis, and the reference symbols $N_1, N_2, \ldots$ denote the refractive index distribution coefficients.

2. A vari-focal lens system according to claim 1, wherein said graded refractive index lens element satisfies the following condition:

$$N_0 < 1.70$$

wherein the reference symbol $N_0$ represents a refractive index of said graded refractive lens element as measured on the optical axis.

3. A vari-focal lens system according to claim 1 or 2 wherein said graded refractive index lens element satisfies the following condition:

$$0 < V_1 < V_0$$

wherein the reference symbol $V_0$ and $V_1$ represent values given by the following formulae respectively when refractive index of the graded refractive lens element for a d-line, F-line and C-line as measured on the optical axis, are represented by $N_0(d)$, $N_0(F)$ and $N_0(C)$ index distribution coefficients of the second order for the d-line, F-line and C-line are designated by $N_1(d)$, $N_1(F)$ and $N_1(C)$ respectively:

$$\nu_0 = \{N_0(d)-1\}/\{N_0(F)-N_0(C)\}$$

$$\nu_1 = \{N_1(d)\}/\{N_1(F)-N_1(C)\}$$

4. A vari-focal lens system according to claim 3, wherein said graded refractive index lens element satisfies the following condition:

$$\nu_1 < 40.$$

5. A vari-focal lens system according to claim 4, wherein said first lens unit comprises an aspherical surface.

6. A vari-focal lens system according to claim 4, wherein said second lens unit comprises an aspherical surface.

* * * * *